(12) United States Patent
Liu et al.

(10) Patent No.: US 11,305,248 B2
(45) Date of Patent: Apr. 19, 2022

(54) HORIZONTAL SUPERCRITICAL FLUID AUTOCLAVE AND APPARATUS THEREOF

(71) Applicant: GUANGZHOU GREEN AND HEALTH BIOTECH CO., LTD., Guangzhou (CN)

(72) Inventors: Hancha Liu, Guangzhou (CN); Yuan Liang, Guangzhou (CN); Shuhua Wu, Guangzhou (CN); Jianyu Xu, Guangzhou (CN); Guohang Yang, Guangzhou (CN); Jitao Xu, Guangzhou (CN); Jiaqi Liang, Guangzhou (CN); Yuehua Liu, Guangzhou (CN); Yuhao Chen, Guangzhou (CN)

(73) Assignee: GUANGZHOU GREEN AND HEALTH BIOTECH CO., LTD., Guangzhou (CN)

( * ) Notice: Subject to any disclaimer, the term of this patent is extended or adjusted under 35 U.S.C. 154(b) by 13 days.

(21) Appl. No.: 17/016,408

(22) Filed: Sep. 10, 2020

(65) Prior Publication Data
US 2022/0072530 A1    Mar. 10, 2022

(51) Int. Cl.
*B01J 3/03* (2006.01)
*B01J 3/04* (2006.01)
*B01J 3/00* (2006.01)

(52) U.S. Cl.
CPC .......... *B01J 3/03* (2013.01); *B01J 3/002* (2013.01); *B01J 3/008* (2013.01); *B01J 3/042* (2013.01); *B01J 2219/182* (2013.01)

(58) Field of Classification Search
CPC .......................................................... B01J 3/03
See application file for complete search history.

(56) References Cited

U.S. PATENT DOCUMENTS

| | | | | |
|---|---|---|---|---|
| 3,667,649 A | * | 6/1972 | Thillet | F17C 13/06 220/323 |
| 3,744,402 A | * | 7/1973 | Piegza | A23L 3/14 99/360 |
| 3,804,288 A | * | 4/1974 | Piegza | F16J 15/52 220/320 |
| 8,365,938 B2 | * | 2/2013 | Ohlson | F42D 5/045 220/4.21 |

(Continued)

FOREIGN PATENT DOCUMENTS

| | | | |
|---|---|---|---|
| CH | 583064 A5 * | 12/1976 | B01J 3/04 |
| DE | 3932225 A1 * | 3/1990 | B01J 3/03 |

*Primary Examiner* — Jennifer A Leung

(57) ABSTRACT

The invention discloses a horizontal supercritical fluid autoclave and an apparatus thereof, and the autoclave including an autoclave body, an end cover, a material frame, a wedge block and a wedge block driving device, wherein the autoclave body is horizontally arranged, and the wedge block driving device can drive the wedge block to move in the radial direction, so that the wedge block can be clamped into a clamping groove at the inner wall of the open end of the autoclave body to lock the end cover or can be separated from the clamping groove of the autoclave body to open the cover. The end cover is small in size and light in weight, and the wedge block type cover mechanism with quick unlocking and locking is adopted; and the structure is simple, the opening/closing of the end cover is simpler and more convenient, and the installation space is saved.

8 Claims, 4 Drawing Sheets

(56) References Cited

U.S. PATENT DOCUMENTS

| | | | | |
|---|---|---|---|---|
| 8,596,484 B1* | 12/2013 | Haibel | ............... | F16J 13/18 |
| | | | | 220/323 |
| 2004/0004081 A1* | 1/2004 | McGuire | ............ | F17C 13/06 |
| | | | | 220/316 |
| 2010/0005710 A1* | 1/2010 | Shaffer | ............... | C10L 5/26 |
| | | | | 44/622 |

* cited by examiner

HORIZONTAL SUPERCRITICAL FLUID AUTOCLAVE AND APPARATUS THEREOF

TECHNICAL FIELD

The invention dates to the technical field of supercritical fluid processing, in particular to a horizontal supercritical fluid autoclave which can be applied to the aspects of polymer material foaming, supercritical fluid dyeing, supercritical fluid aerogel drying, supercritical fluid extraction and the like, and an apparatus thereof.

BACKGROUND ART

Supercritical fluid processing technology is a novel technology in order to stabilize product quality and improve production efficiency, this technology has great development space in process research, apparatus structure design and others. The structure design of supercritical fluid autoclave is one of the key factors affecting product quality and production efficiency.

Autoclave belongs to a quick-opening high-pressure apparatus, which not only meets the requirements of mechanical strength and rigidity of high-pressure vessel, but also quires frequent cover opening in production, so that its cover opening convenience, safety, reliable sealing, operating efficiency and the like become important factors in design. For example, a horizontal autoclave adopting a structure of a clamp hoop type locking cover appears on the market at present. The structure of the clamp hoop type locking cover can improve the opening and locking convenience, but it is complex in structure and high in cost. The clamp hoop needs to be clamped outside the end cover and the autoclave body, and the outer diameter of the end cover is required to be as large as the outer diameter of the autoclave body, which greatly increases the volume and the weight of the end cover; and as the weight of the end cover is large, it also increases the difficulty that the end cover is pulled out and pushed in by a cover opening auxiliary device, and the rigidity of the cover opening auxiliary device must be enough; otherwise, the cover opening auxiliary device is easy to deform, the operation precision of opening/closing the end cover is reduced, and even more seriously, the end cover cannot be pushed into the autoclave body.

SUMMARY OF THE INVENTION

It is an object of the present invention to overcome the defects in the prior art and to provide a horizontal supercritical fluid autoclave adopting a wedge type cover mechanism with quick unlocking and locking, and an apparatus thereof.

In order to achieve the above object, the first aspect of the present invention provides a horizontal supercritical fluid autoclave, comprising an autoclave body, an end cover, at least two wedge blocks and at least two wedge block driving devices, wherein the autoclave body is horizontally arranged, the interior of the autoclave body is hollow, one end of the autoclave body is opened to form an open end, and the other end of the autoclave body is closed to form a sealed end; the autoclave body is provided with a high-pressure fluid inlet and a high-pressure fluid outlet which are respectively communicated with the interior of the autoclave body, and an inner wall of the open end of the autoclave body is provided with clamping grooves for clamping and matching with the wedge blocks; the end cover is sealingly mounted in the open end of the autoclave body to seal the open end of the autoclave body; the wedge block driving device is mounted at an outer end part of the end cover, the wedge block driving devices are in transmission connection with the wedge blocks, and the wedge block driving devices can drive the corresponding wedge blocks to move in a radial direction, so that the wedge block can be clamped into the clamping groove of the autoclave body when the end cover is locked or can be separated from the clamping groove of the autoclave body when the cover is opened.

As a preferred implementation, the wedge block is provided with five ones, the wedge block driving device is provided with five ones, each wedge block is respectively provided with an arc shape, the five wedge blocks can be combined to form an annular structure, and the clamping groove is formed to be an annular clamping groove.

As a preferred implementation, the wedge driving means is provided as an air cylinder.

As a preferred implementation, a sealing ring is arranged between the end cover and the inner wall of the autoclave body, and the end cover is sealingly arranged inside the open end of the autoclave body by the sealing ring so as to realize high-pressure self-tightening sealing between the end cover and the autoclave body.

As a preferred implementation, a heat-preservation jacket is arranged outside the autoclave body, a heat-preservation interlayer is formed between the heat-preservation jacket and the autoclave body, and a heat-preservation medium inlet and a heat-preservation medium outlet which are respectively communicated with the heat-preservation interlayer are arranged on the heat-preservation jacket.

As a preferred implementation, a support for supporting is arranged outside the heat-preservation jacket.

As a preferred implementation, a material frame is placed inside the autoclave body and fixedly connected with an inner end part of the end cover, the material frame is a frame type structure used for loading or hanging materials, and a guide wheel is arranged at the bottom of the material frame.

A second aspect of the present invention provides a horizontal supercritical fluid processing apparatus, comprising a horizontal supercritical fluid autoclave according to the above technical solution, and a cover opening auxiliary device for axially pulling out the end cover and axially pushing the end cover into the interior of the open end of the autoclave body, the cover opening auxiliary device being located in front of the open end of the autoclave body.

As a preferred implementation, the cover opening auxiliary device is provided with an insertion hole, the outer end part of the end cover is provided with an axially arranged plug pin part, the plug pin part is provided with a radially arranged pin hole, and the plug pin part is fixed with the cover opening auxiliary device by a fixing pin inserted into the pin hole after being inserted into the insertion hole of the cover opening auxiliary device.

As a preferred implementation, the cover opening auxiliary device comprises a cover opening auxiliary trolley and an axially arranged guide rail, and the cover opening auxiliary trolley runs on the guide rail.

Compared with the prior art, the invention has the the following beneficial effects.

1. The end cover of the autoclave of the invention is arranged inside the open end (at an inner diameter position) of the autoclave body. Compared with an autoclave adopting a clamp hoop type cover opening structure, the end cover is not required to adopt the same outer diameter size as the autoclave body, so that the size of the end cover is greatly reduced, and the weight is light; the wedge block type cover mechanism with quick unlocking and locking is adopted, and the wedge block driving devices can drive the corresponding wedge blocks to move in the radial direction, so that the wedge blocks can be clamped into the clamping grooves at the inner wall of the open end of the autoclave body to lock the end cover or the wedge block can be separated from the clamping groove of the autoclave body to open the cover. The structure is simple and compact, the design is reasonable, the sealing is more reliable, the end cover can be opened/closed more simply and conveniently, and the wedge blocks are mounted inside the open end of the autoclave body together with the end cover, so that installation space is saved.

2. The end cover of the autoclave of the invention is connected with the material frame to form an integrated structure, so that entering/leaving of the material frame and opening/closing of the end cover are integrated, and thus the end cover only needs to move in one axial direction, so that the operation is simpler and more convenient; and after the cover is opened, the end cover is not required for radial avoidance movement due to the entering/leaving of the material frame, the cover opening operation is simplified, and the operation space is saved.

3. Due to the light weight of the end cover, the rigidity deformation of the corresponding cover opening auxiliary device is small, so that the cover opening auxiliary device can adopt a relatively light structure to reduce the manufacturing and using cost of the apparatus; the rigidity requirement can be met, the installation space is saved, the movement position of the opening/closing end cover during operation can be more accurate, and the sealing reliability is guaranteed; and the cover opening auxiliary device is simple in structure, small in occupied area and convenient to operate.

DETAILED DESCRIPTION OF THE INVENTION

Embodiment I

Figure 1:
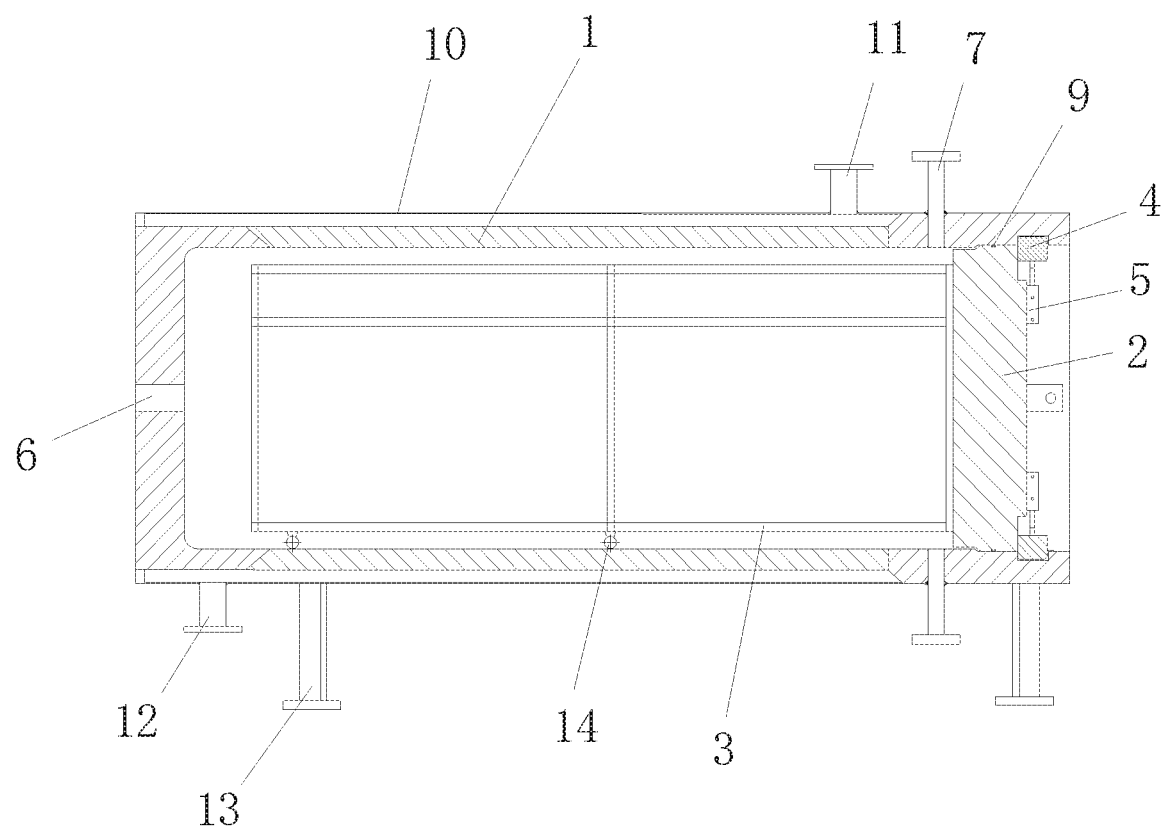
FIG. 1 is a structurally schematic view of a horizontal supercritical fluid autoclave.

Referring to FIG. 1, Embodiment I of the present invention provides a horizontal supercritical fluid autoclave, comprising an autoclave body 1, an end cover 2, a material frame 3, a wedge block 4 and a wedge block driving device 5 and other components, and each of the components of the horizontal supercritical fluid autoclave is described in detail with reference to the accompanying drawings.

Figure 2:
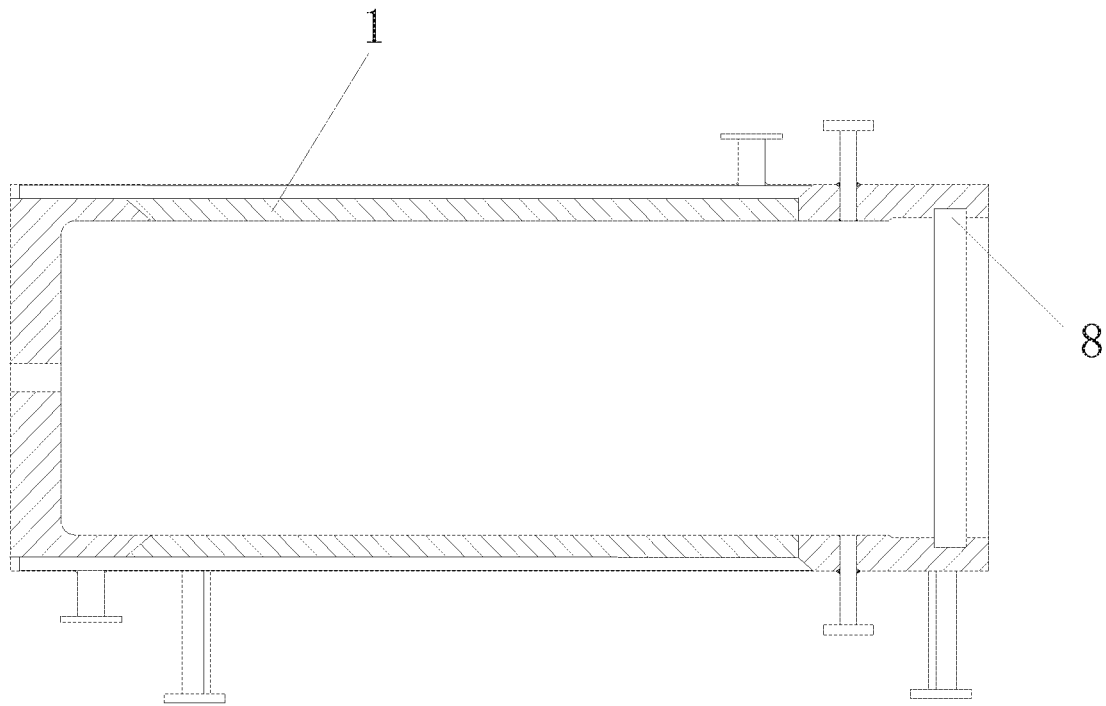
FIG. 2 is a structurally schematic view of an autoclave body.

As shown in FIGS. 1 and 2, the autoclave body 1 is horizontally arranged, so that loading, cleaning or other operations of materials are facilitated, the interior of the autoclave body 1 is hollow, one end of the autoclave body 1 is opened to form an open end, and the other end of the autoclave body 1 is closed to form a sealed end. The inner wall of the open end of the autoclave body 1 is provided with clamping grooves 8 for clamping and matching with the wedge blocks 4. In addition, the autoclave body 1 is provided with a high-pressure fluid inlet 6 and a high-pressure fluid outlet 7 which are respectively communicated with the interior of the autoclave body 1, the high-pressure fluid inlet 6 can be arranged at the sealed end of the autoclave body 1, and the high-pressure fluid outlet 7 can be arranged at the top and/or the bottom of the autoclave body 1 and close to the open end of the autoclave body 1.

Figure 3:
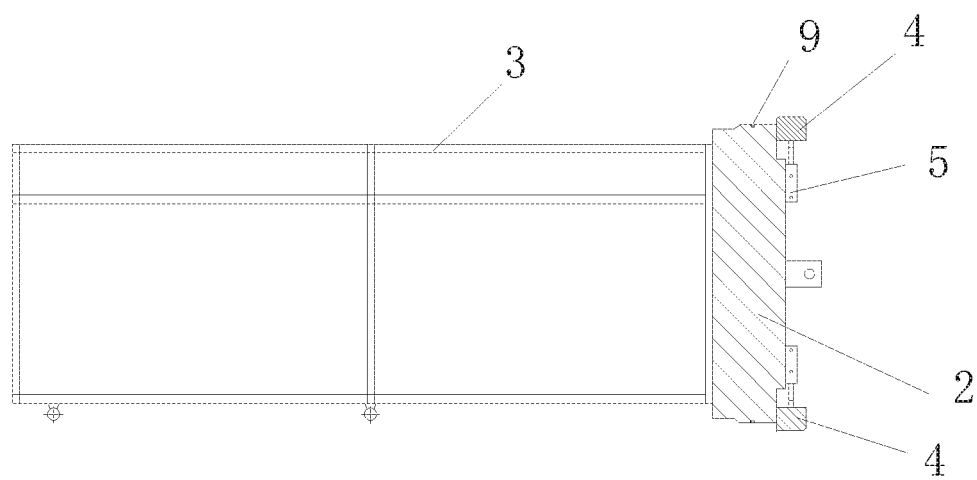
FIG. 3 is a structurally schematic view of an end cover and components attached to the end cover.

As shown in FIGS. 1 and 3, the end cover 2 is sealingly arranged inside the open end of the autoclave body 1 and can close the open end of the autoclave body 1, an O-shaped sealing ring 9 is arranged between the end cover 2 and the inner wall of the autoclave body 1, and the end cover 2 can realize high-pressure self-tightening sealing with the autoclave body 1 by the sealing ring 9.

Figure 4:
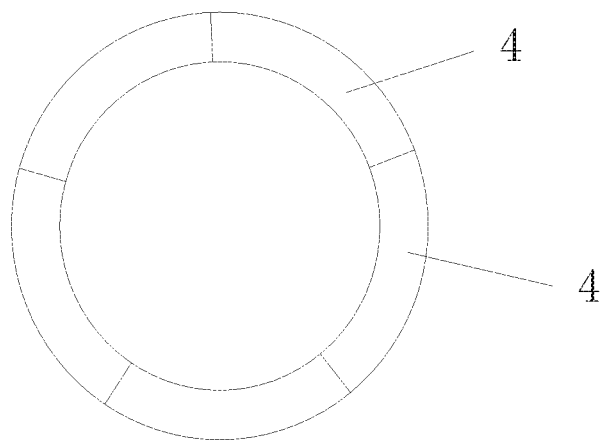
FIG. 4 is a combined state diagram of wedge blocks.

As shown in FIG. 1, the wedge block driving device 5 is mounted at an outer end part of the end cover 2, and the wedge block driving device 5 is in transmission connection with the wedge block 4. In the present embodiment, the wedge blocks 4 may preferably be provided with five ones, the wedge block driving device 5 may preferably be provided with five ones, each of the wedge blocks 4 may be respectively arranged with an arc shape, the five wedge blocks 4 may be combined to form an annular structure as shown in FIG. 4, and accordingly, the clamping grooves 8 of the autoclave body 1 may also be provided as annular clamping grooves matched therewith. The combined wedge block structure has a good locking effect. When specially implemented, the wedge block driving device 5 may preferably be provided as an air cylinder. Of course, in other embodiments, other electric driving devices (such as a motor+screw rod) or manual driving device may be used as long as the respective wedge block 4 can be driven to move in the radial direction.

As shown in FIGS. 1 and 3, a material frame 3 is placed inside the autoclave body 1, one end of the material frame 3 is fixedly connected with an inner end of the end cover 2, and the material frame 3 is provided in a frame type structure for loading or hanging materials such as stereoscopic soles, sheet materials, other forming members, bulk particles and the like, wherein the end cover is connected with the material frame to form an integrated structure, so that entering/leaving of the material frame and opening/closing of the end cover are integrated, and thus the end cover only needs to move in one axial direction, so that the operation is simpler and more convenient; and after the cover is opened, the end cover is not required for radial avoidance movement due to the entering/leaving of the material frame, the cover opening operation is simplified, and the operation space is saved.

Preferably, the bottom of the material frame 3 may also be provided with guide wheels 14 to facilitate entering/leaving movement of the material frame 3.

As shown in FIG. 1, a heat-preservation jacket 10 can be arranged outside the autoclave body 1, a heat-preservation interlayer is formed between the heat-preservation jacket 10 and the autoclave body 1, and a heat-preservation medium inlet 11 and a heat-preservation medium outlet 12 which are respectively communicated with the heat-preservation interlayer are arranged on the heat-preservation jacket 10. Preferably, the heat-preservation medium inlet 11 may be provided at the top of one end of the autoclave body 1, the heat-preservation medium outlet 12 may be provided at the bottom of the other end of the autoclave body 1, and the heat-preservation medium may be hot water, hot oil, etc.

Further, the outside of the heat-preservation jacket 10 may be provided with a support 13 for supporting the entire autoclave.

During the working, after the end cover is pushed inside the open end of the autoclave body 1, the wedge block driving devices 5 can drive the corresponding wedge blocks 4 to move in the radial direction, so that the wedge blocks 4 can be clamped into the clamping grooves 8 of the autoclave body 1 to lock the end cover 2. When the cover is opened, the wedge block driving device 5 can drive the wedge block 4 to be separated from the clamping groove 8 of the autoclave body 1.

The end cover of the foaming autoclave is arranged inside the open end (at an inner diameter position) of the autoclave body. Compared with an autoclave adopting a clamp hoop type cover opening structure, the end cover is not required to adopt the same outer diameter size as the autoclave body, so that the size of the end cover is greatly reduced, and the weight is light; the wedge block type cover mechanism with quick unlocking and locking is adopted, and the wedge block driving devices can drive the corresponding wedge blocks to move in the radial direction, so that the wedge blocks can be clamped into the clamping grooves at the inner wall of the open end of the autoclave body to lock the end cover or the wedge block can be separated from the clamping groove of the autoclave body to open the cover. The structure is simple and compact, the design is reasonable, the sealing is more reliable, the end cover can be opened/closed more simply and conveniently, and the wedge blocks are mounted inside the open end of the autoclave body together with the end cover, so that installation space is saved.

Embodiment II

Figure 5:
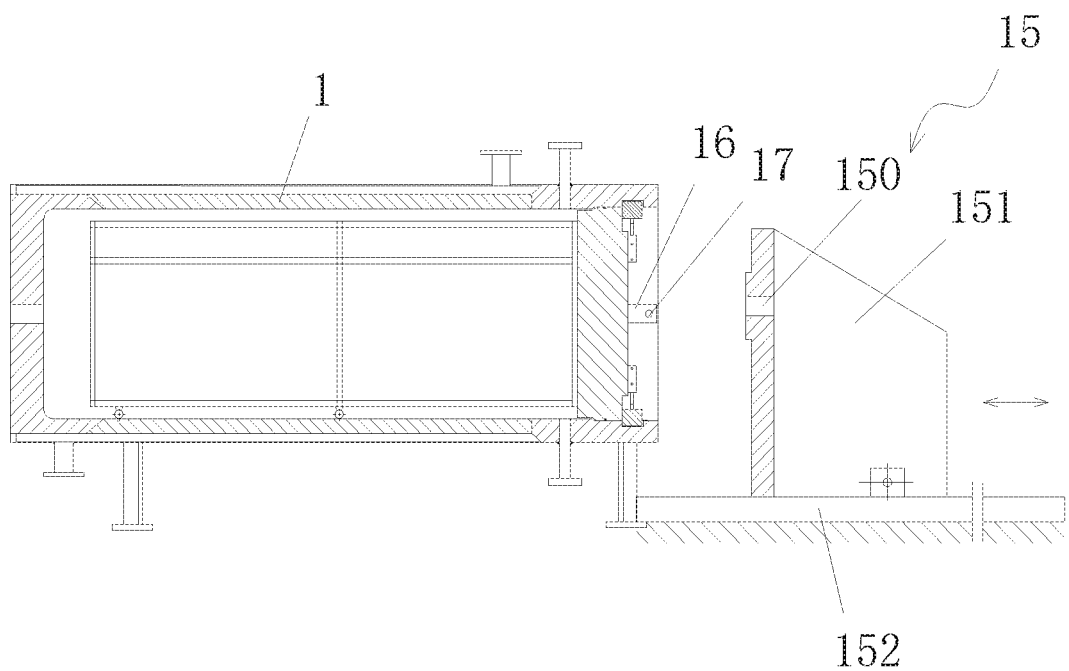
FIG. 5 is a structurally schematic view of a horizontal supercritical fluid processing apparatus.

Referring to FIG. 5, Embodiment II of the present invention provides a horizontal supercritical fluid processing apparatus, comprising the horizontal supercritical fluid autoclave described in the above Embodiment I, and a cover opening auxiliary device 15 for axially pulling out the end cover 2 and axially pushing the end cover 2 into the interior of the open end of the autoclave body 1, the cover opening auxiliary device 15 being located in front of the open end of the autoclave body 1.

Since the structure and principle of the horizontal supercritical fluid autoclave of this embodiment are the same as those of Embodiment I described above, further description will be omitted.

As shown in FIG. 5, the cover opening auxiliary device 15 may include an cover opening auxiliary trolley 151, and an axially arranged guide rail 152 on which the cover opening auxiliary trolley 151 can run.

Figure 6:
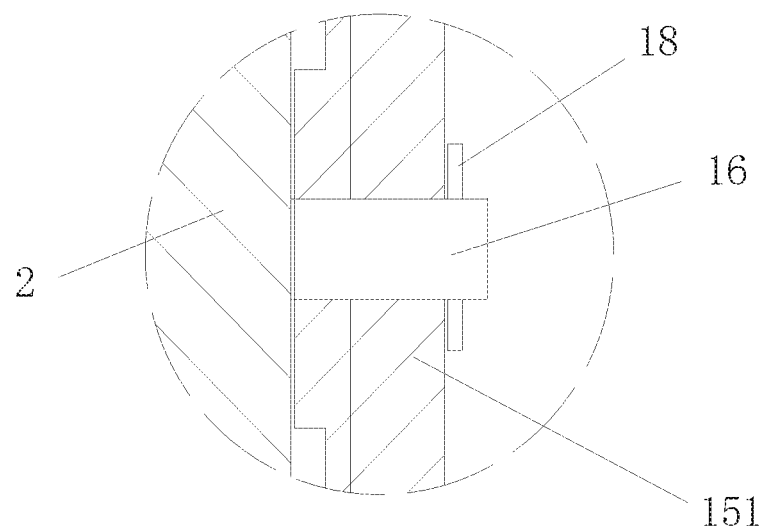
FIG. 6 is an enlarged view of a connection of the end cover to the cover opening auxiliary device.

The cover opening auxiliary trolley 151 is provided with an insertion hole 150, and the outer end part of the end cover 2 is provided with an axially arranged plug pin part 16 matched with the insertion hole 150, and the plug pin part 16 is provided with a radially arranged pin hole 17. As shown in FIG. 6, when the plug pin part 16 is inserted into the insertion hole 150 of the cover opening auxiliary trolley 151, the plug pin part 16 can be fixed with the cover opening auxiliary trolley 151 by a fixing pin 18 inserted into the pin hole 17. Therefore, the end cover 2 can be quickly connected with the cover opening auxiliary trolley 151 to achieve convenient installation and disassembly.

After the wedge block type cover mechanism with quick unlocking and locking is opened, the cover opening auxiliary trolley 151 can be connected with the end cover 2 and pull out the end cover 2 to complete the cover opening operation. Since the air cylinder and the wedge block of the wedge block type cover mechanism with quick unlocking and locking are both mounted on the end cover 2, these components move integrally with the end cover when the end cover is opened and closed.

Due to the fact that the material frame is connected with the end cover, when the end cover is pulled out and pushed, the material frame can enter and exit along with the end cover, and the entering and exiting operations of the end cover and the material frame can be completed by a cover opening auxiliary trolley. Moreover, the cover opening auxiliary trolley only needs to move in one axial direction to finish the opening/closing operation of the end cover and the entering/exiting operation of the material frame at the same time.

According to the technical scheme of the embodiment, due to the light weight of the end cover, the rigidity deformation of the corresponding cover opening auxiliary device is small, so that the cover opening auxiliary device can adopt a relatively light structure to reduce the manufacturing and using cost of the apparatus; the rigidity requirement can be met, the installation space is saved, the movement position of the opening/closing end cover during operation can be more accurate, and the sealing reliability is guaranteed; and the cover opening auxiliary device is simple in structure, small in occupied area and convenient to operate.

It should be noted herein that, according to practical requirements, in addition to the plug pin-type connection between the cover opening auxiliary trolley 151 and the end cover 2, other fixed connections may be used. The cover opening auxiliary device 15 may use other types of cover opening devices in addition to the cover opening auxiliary device trolley, and is not limited to this embodiment and can be implemented as long as the end cover 2 can be stably pulled out from the interior of the autoclave body 1 and accurately pushed into the autoclave body 1.

The horizontal supercritical fluid autoclave can be applied to the industrial application field of supercritical fluid foaming of stereoscopic soles, sheets, other forming members, bulk particles and other products of polymer materials, and can also be applied to the industrial fields of supercritical fluid dyeing, supercritical fluid aerogel drying, supercritical fluid extraction, and so on.

The above-described embodiments are preferred embodiments of the present invention, but the implementations of the present invention are not limited to the above-described embodiments, and any other changes, modifications, replacements, combinations, and simplifications, which do not depart from the spirit and principles of the present invention, are intended to be equivalent substitutions and included within the scope of the present invention.

The invention claimed is:

1. A horizontal supercritical fluid processing apparatus, comprising a horizontal supercritical fluid autoclave and a cover opening auxiliary device;
    wherein the horizontal supercritical fluid autoclave comprises an autoclave body, an end cover, at least two wedge blocks and at least two wedge block driving devices,
    wherein the autoclave body is horizontally arranged, an interior of the autoclave body is hollow, one end of the autoclave body is opened to form an open end, and the other end of the autoclave body is closed to form a sealed end; the autoclave body is provided with a high-pressure fluid inlet and a high-pressure fluid outlet which are respectively communicated with the interior of the autoclave body, and an inner wall of the open end of the autoclave body is provided with clamping grooves for clamping and matching with the wedge blocks; the end cover is sealingly mounted in the open end of the autoclave body to seal the open end of the autoclave body, the wedge block driving devices are mounted at an outer end part of the end cover, the wedge block driving devices are in transmission connection with the wedge blocks, and the wedge block driving devices drive the corresponding wedge blocks to move in a radial direction, so that the wedge blocks are clamped into the clamping grooves of the autoclave body when the end cover is locked or the wedge blocks are separated from the clamping grooves of the autoclave body when the end cover is opened;

wherein the cover opening auxiliary device is configured for axially pulling out the end cover and axially pushing the end cover into an interior of the open end of the autoclave body, the cover opening auxiliary device being located in front of the open end of the autoclave body;

wherein the cover opening auxiliary device is provided with an insertion hole, the outer end part of the end cover is provided with an axially arranged plug pin part, the plug pin part is provided with a radially arranged pin hole, and the plug pin part is fixed with the cover opening auxiliary device by a fixing pin inserted into the pin hole after the plug pin part is inserted into the insertion hole of the cover opening auxiliary device.

2. The horizontal supercritical fluid processing apparatus according to claim 1, wherein there are five wedge blocks and five wedge block driving devices; each wedge block is respectively arranged with an arc shape, the five wedge blocks are combined to form an annular structure, and the clamping grooves are annular clamping grooves.

3. The horizontal supercritical fluid processing apparatus according to claim 1, wherein the wedge block driving devices are air cylinders.

4. The horizontal supercritical fluid processing apparatus according to claim 1, wherein a sealing ring is arranged between the end cover and the inner wall of the autoclave body, and the end cover is sealingly arranged inside the open end of the autoclave body by the sealing ring so as to realize high-pressure self-tightening sealing between the end cover and the autoclave body.

5. The horizontal supercritical fluid processing apparatus according to claim 1, wherein a heat-preservation jacket is arranged outside the autoclave body, a heat-preservation interlayer is formed between the heat-preservation jacket and the autoclave body, and a heat-preservation medium inlet and a heat-preservation medium outlet which are respectively communicated with the heat-preservation interlayer are arranged on the heat-preservation jacket.

6. The horizontal supercritical fluid processing apparatus according to claim 5, wherein a support for supporting is arranged outside the heat-preservation jacket.

7. The horizontal supercritical fluid processing apparatus according to claim 1, wherein a material frame is placed inside the autoclave body and fixedly connected with an inner end part of the end cover, the material frame is a frame structure used for loading or hanging materials, and guide wheels are arranged at the bottom of the material frame.

8. The horizontal supercritical fluid processing apparatus according to claim 1, wherein the cover opening auxiliary device comprises a cover opening auxiliary trolley and an axially arranged guide rail, and the cover opening auxiliary trolley runs on the guide rail.

* * * * *